(12) United States Patent
Duong (10) Patent No.: US 11,933,483 B2
(45) Date of Patent: Mar. 19, 2024

(54) SYSTEMS AND METHODS FOR A HEAT SINK

(71) Applicant: Libra Design LLC, Bee Cave, TX (US)

(72) Inventor: Dung Duong, Bee Cave, TX (US)

(73) Assignee: LIBRA DESIGN LLC, Bee Cave, TX (US)

(*) Notice: Subject to any disclaimer, the term of this patent is extended or adjusted under 35 U.S.C. 154(b) by 0 days.

(21) Appl. No.: 17/975,111

(22) Filed: Oct. 27, 2022

(65) Prior Publication Data

US 2023/0133955 A1    May 4, 2023

Related U.S. Application Data

(60) Provisional application No. 63/273,604, filed on Oct. 29, 2021.

(51) Int. Cl.
*F21V 29/71* (2015.01)
*A01G 7/04* (2006.01)
*A01G 9/24* (2006.01)
*F21V 29/76* (2015.01)
*F21V 29/83* (2015.01)
*F21Y 115/10* (2016.01)

(52) U.S. Cl.
CPC .......... *F21V 29/713* (2015.01); *F21V 29/763* (2015.01); *F21V 29/83* (2015.01); *A01G 7/045* (2013.01); *A01G 9/249* (2019.05); *F21Y 2115/10* (2016.08)

(58) Field of Classification Search
CPC ...... F21V 29/713; F21V 29/763; F21V 29/83; F21V 29/74; F21V 29/745; F21V 29/75; F21V 29/76; F21V 29/77; F21V 29/767; F21V 29/773; F21V 29/777; F21V 19/0055; F21V 19/04; A01G 7/045; A01G 9/249; F21Y 2103/10; F21S 4/28
See application file for complete search history.

(56) References Cited

U.S. PATENT DOCUMENTS

| | | | | |
|---|---|---|---|---|
| 3,132,431 | A * | 5/1964 | Petrie | G09F 15/0012 40/792 |
| 6,269,864 | B1* | 8/2001 | Kabadi | F28F 3/022 174/16.3 |
| 9,587,810 | B2* | 3/2017 | Parekh | F21S 4/28 |
| 2010/0277666 | A1* | 11/2010 | Bertram | G02F 1/133603 362/249.02 |
| 2011/0069493 | A1* | 3/2011 | Huang | H05K 1/021 362/382 |
| 2011/0110087 | A1* | 5/2011 | Hochstein | F21V 29/83 362/249.02 |
| 2012/0113634 | A1* | 5/2012 | Wong | F21V 23/009 362/249.02 |
| 2015/0098222 | A1* | 4/2015 | Lin | F28F 3/02 362/249.02 |
| 2017/0023229 | A1* | 1/2017 | Klase | A01G 9/249 |
| 2017/0352605 | A1* | 12/2017 | Bilan | F21V 29/76 |

FOREIGN PATENT DOCUMENTS

CN       101430084 A  *  5/2009
DE    202015104043 U1 *  4/2016 .......... F21V 19/0035

* cited by examiner

*Primary Examiner* — Erin Kryukova
(74) *Attorney, Agent, or Firm* — PIERSON IP, PLLC (57) ABSTRACT

A passive system that creates a cross-flow and directly flow thermal management system to dissipate large amounts of heat in a slim light fixture.

8 Claims, 7 Drawing Sheets

SYSTEMS AND METHODS FOR A HEAT SINK

BACKGROUND INFORMATION

Field of the Disclosure

Examples of the present disclosure are related to systems and methods for a heat sink. More particularly, embodiments disclose a light fixture with a heat sink configured to dissipate heat caused by the light fixture, wherein the heat sink includes vents that extend orthogonal to an extruded axis of fins of the heat sink.

Background

Greenhouses are buildings or complexes in which plants are grown. For various reasons including price, it is typically ideal for greenhouses to operate with as much natural sunlight as possible. To supplement natural light from the sun, high powered lights are used within greenhouses when the sun or other natural light does not provide enough light for optimal plant growth.

However, the operation of the high-powered lights is more costly than utilizing free sunlight. More so, conventional high-powered lights are larger in size, which blocks the incoming free sunlight. Furthermore, the blocking of the incoming sunlight causes shading on the plants within the greenhouse, which negatively impacts the grower's productivity.

Although light emitting diodes (LEDs) are more efficient than traditional high-powered lights, their manufacturing costs are higher. Additionally, the LEDs cause excessive shading based on requiring larger fixtures to dissipate heat. To circumvent the large fixtures required to dissipate the heat, some manufacturers have attempted to build smaller LED fixtures that use active cooling fans. However, in greenhouse environments, active cooling fans quickly clog with dirt, bugs, etc. This causes the LED fixtures with active cooling fans to quickly become inoperable.

Conventional LED fixtures that do not include active cooling fans use traditional linear heat sinks. Heat generated through conventional LED fixtures may dissipate based on convection, conduction or radiation. However, due to LED fixtures being suspended, there is minimal heat dissipation via conduction. Radiation is a function of the fixture temperature and may be significant, and convection is the primary method to dissipate heat. In applications, air particles remove heat from the fixture through air movement. For longer heat sinks, air movement within the middle of the fixtures is minimal. This severely limits the amount of power conventional LED fixtures can consume because additional power consumption leads to more heat.

Accordingly, needs exist for more effective and efficient systems and methods for a heat sink that includes vents that extend orthogonal to an extruded axis of fins of the heat sink, wherein the vents allow direct and cross flow air movement.

SUMMARY

Embodiments disclosed herein describe systems and methods for heat sinks within light fixtures. In embodiments, a heat sink may be a passive system that continually and passively creates direct flow and cross-flow thermal management system dissipating large amounts of heat in a slim light fixture. Embodiments may utilize a series of extruded and exposed fins that increase the surface area of the heat sink creating additional air flow. As hotter air rises within the system, cooler is drawn into the heatsink. The fins may have exposed sides, partially exposed lower surfaces, and exposed upper surfaces. The exposed and unobstructed surfaces may allow cooler air to be drawn towards the central axis of the light fixture above the light source, and then flow upward. This process may cool the fins by passively drawing cooler air within a body of the light fixture, wherein the drawn air is configured to flow between pairs of fins. Additionally, the spacing between the fins may be wide enough to allow for air to freely enter the heatsink.

Specifically, embodiments may include light sources, thermal grease, a base (such as Metal Core PCB, thermal PCB or metal backed PCB), and a plurality of the extruded fins.

The light sources may be an artificial light source that is configured to stimulate plant growth by emitting light. For example, the light source may be LEDs. The light sources may be utilized to create light or supplement natural light to the area of interest. The light sources may provide a light spectrum that is similar to the sun, or provide a spectrum that is tailored to the needs of particular pants being cultivated. In embodiments, responsive to generating light the light sources may generate heat. One skilled in the art may appreciate that in alternative embodiments the light sources may be replaced with any device that generates heat.

The thermal grease may be a substance or device that is configured to promote thermal conduction between the plurality of fins and the light sources or heat generating sources. In embodiments, the thermal grease may be configured to be directly adjacent to and between the base and the light sources. In embodiments, one skilled in the art may appreciate that alternative embodiments may include thermal glue, thermal pads, or any other device that increases thermal conduction between elements.

The base may be metal core PCB or any other device that has a metal material to spread heat generated by the light sources. In embodiments the base may be formed of unextruded parts of an aluminum block. The base may be configured to divert heat away from the light sources and circuitry and towards the heat sink formed of the plurality of fins. In embodiments, the plurality of fins may be directly mounted to the base.

In embodiments, the base may include a plurality of vents, wherein the vents extend in a directional orthogonal to extruded axis of the plurality of fins. In embodiments, the vents may be machined into the base. For example, the extruded axis may extend along the longitudinal (long) axis of the heat sink, and the vents may extend along a lateral (short) of the heat sink. In embodiments, a width of the vents may correspond to a pitch of or distance between adjacent fins. Additionally, a spacing between adjacent vents may correspond to a length of the lateral axis the heat sink or a distance between a face of the outermost fin and a face of the innermost fin. This specific geometry may effectively and efficiently allow for cross flow through the unvented area of the plurality of fins and direct flow across the fins through the vented areas.

The plurality of fins may be formed by extruding the unitary block of metal, such as an aluminum block, which is the same block that forms the base. The plurality of fins may be formed via linear extrusions that extend along the longitudinal axis of the heat sink to create long fins. In other words, the extrusions may extend through the longitudinal axis of the block, such that the extrusions are longer than a width of the plurality of fins. Additionally, while the fins are being extruded, the base may be simultaneously formed below the fins. The base and fins may be created by passing the unitary block of metal through a die, wherein the base portions of the die does not include fin extrusions. To this end, the plurality of fins and the base may be formed from the unitary block of metal.

While operating, the light source may create heated air. As the air is being heated, the heated air may move around the edges of the outer fins. Additionally, the heats air may move towards the vents and directly through a lower surface of the fins through the vents. The heated air may then move vertically between pairs of fins from the lower surface of the fins towards an upper surface of the fins. The heated air may move directly in a vertical flow through the vents to dissipate directly into the atmosphere. The heated air may also move between pairs of fins towards a front of the heat sink and towards a rear of the heat sink. This may more evenly move air through the heat sink by allowing simultaneously cross flow of air through a plurality of pairs of vents along the longitudinal axis of the heat sink and direct air flow through the plurality of pairs of vents.

Accordingly, by positioning the vents across the width of the heat sink, a portion of the heated air is only required to move vertically through the fins, while also allowing air to move towards the front and back of the heat sink over the unvented portion of the base, which may more uniformly disturbed the generated heat over the heat sink.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for heat sinks within light fixtures. In embodiments, the heat sink may be a passive system that creates a cross-flow and direct thermal management system configured to dissipate large amounts of heat in a slim light fixture.

Figure 1:
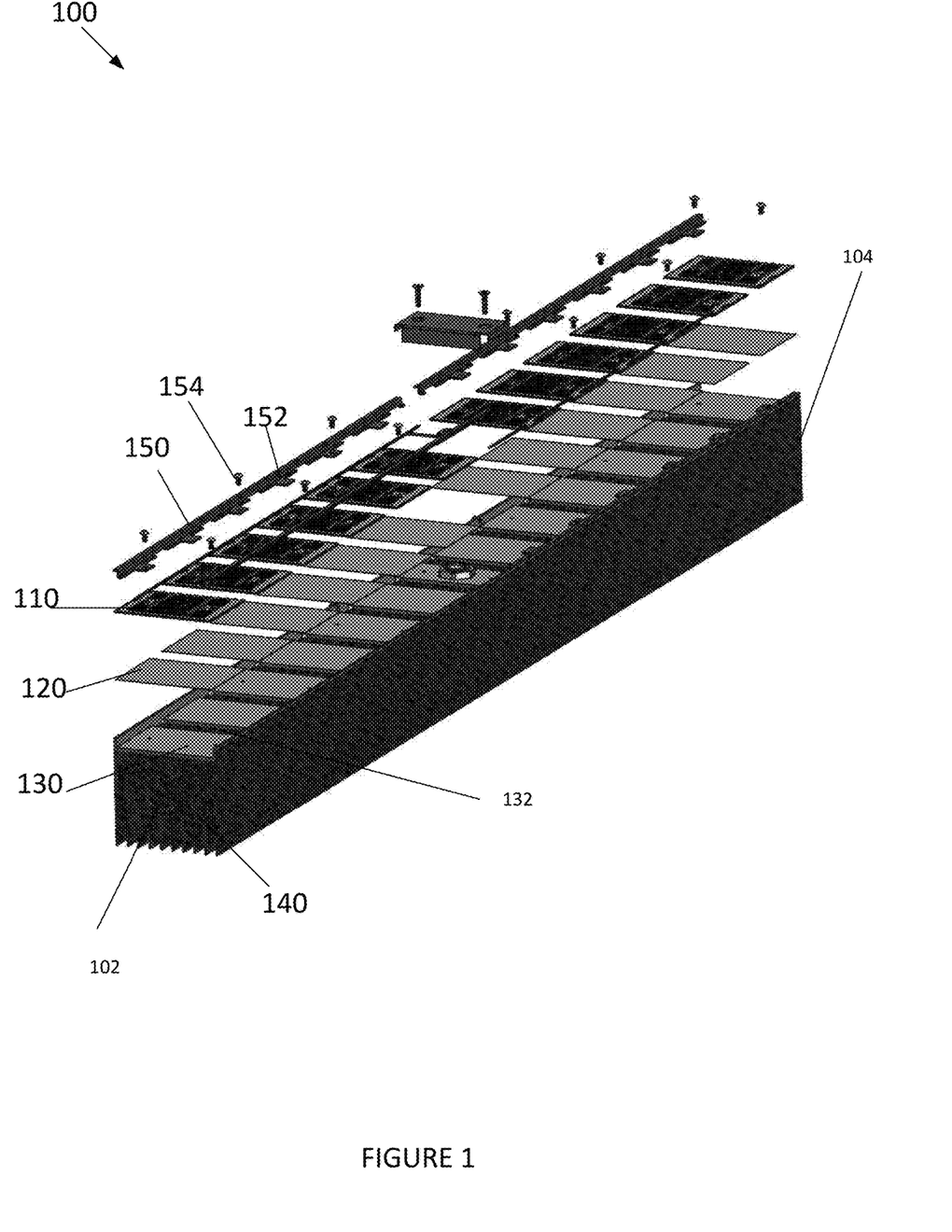
FIG. 1 depicts a heat sink system, according to an embodiment.

FIG. 1 depicts a heat sink system 100, according to an embodiment. Heat sink system 100 may include light sources 110, thermal grease 120, base 130, fins 140, and rails 150.

Light sources 110 may be any device that is configured to generate heat into the atmosphere, wherein it is desirable to dissipate the heat into the atmosphere. For example, light sources 110 may be an artificial light source that is configured to stimulate plant growth by emitting light. In a specific embodiment, light sources 110 may be LEDs. Light sources 110 may be utilized to create light or supplement natural light to the area of interest. Light sources 110 may provide a light spectrum that is similar to the sun, or provide a spectrum that is tailored to the needs of particular pants being cultivated.

Thermal grease 120 may be a substance, device, etc. that is configured to promote thermal conduction between the plurality of fins 140 and the light sources 110 or heat generating sources. Thermal grease 120 may be configured to be directly adjacent to and between the base 130 and the light sources 110. In embodiments, one skilled in the art may appreciate that alternative embodiments may include thermal glue, thermal pads, or any other device that increases thermal conduction between elements. Specifically, thermal grease 120 may be configured to assist fins 140 to uniformly dissipate heat into the atmosphere by promoting the thermal conduction between fins 140 and light sources 110.

Base 130 may be metal core PCB or any other device that has a metal material to spread heat generated by light sources 110. Base 130 may be configured to divert heat away from the light sources 110 and circuitry and towards the heat sink formed of the plurality of fins 140. In embodiments, base 130 and fins 140 may be formed from a same block of aluminum, and base 130 is formed by not extruding the aluminum at desired locations. Alternatively, the plurality of fins 140 may be directly mounted to base 130.

Base 130 may include a plurality of vents 132 or openings that extend across an entirety of a lower surface of heat sink 100 to expose lower surfaces of each of the plurality of fins 140 to an area below heat sink 100. Vents 132 may be machined portions of base 130 that extend in a directional orthogonal to extruded axis of the plurality of fins 140. For example, the extruded axis may extend along the longitudinal (long) axis of the heat sink 100, and the vents may extend along a lateral (short) axis of the heat sink 100. In other words, the width of vents 132 may be longer than a length of vents 132, which may allow a lower surface of each of the plurality of fins 140 to be unobstructed and not covered by base 130 over desired intervals. In embodiments, a length of the vents 132 may correspond to a pitch of or distance between adjacent fins 140 along the lateral axis. Additionally, a spacing between adjacent vents 132 may correspond to a length of the lateral axis the heat sink 100 or a distance between a face of the outermost fin 140 and a face of the innermost fin 140. This specific geometry may effectively and efficiently allow for cross flow through the unvented area of the plurality of fins 140 and direct flow across the fins through the vented areas. Specifically, the air may flow axially in multiple directions along the longitudinal axis between each adjacent pair of vents 132. This may enable each cross section of heat sink 100 along the longitudinal axis to have a more symmetrical thermal heat profile than unvented systems or systems utilizing fins 140 extruded along a later axis.

The plurality of fins 140 may be formed by extruding a unitary block of metal, such as an aluminum block. The extrusions may extend through the longitudinal axis of the block, such that the extrusions are longer than a width of the plurality of fins 140. Additionally, while the fins 140 are being extruded, the base 130 may simultaneously formed below the fins. The base 130 and fins 140 may be created by passing the unitary block of metal through a die, wherein the base 130 portions of the die does not include fin 140 extrusions. To this end, the plurality of fins 140 and the base 130 may be formed from the unitary block of metal. The plurality of fins 140 may extend along an entirety, and in parallel to, the longitudinal axis of heat sink 100. The plurality of fins 140 may be evenly spaced apart along the lateral axis of the heat sink 100. Each of the plurality of fins 140 may have the same height, or the plurality of fins 140 may have different heights. The inner faces and outer faces of each of the fins 140 may include etching, which may increase a surface area of the plurality of fins 140. In embodiments, a lower surface of each of the plurality of fins 140 may be obstructed by base 130 and unobstructed by vents 132. This may allow portions of the lower surfaces of the each of the plurality of fins 140 to be obstructed and unobstructed at desired intervals.

Furthermore, the cross flow of heated air may cause portions of air traveling through a first vent to flow towards first end 102 of heat sink 100, and cause other portions of air traveling through the first vent to flow towards second end 104 of heat sink. When the air is traveling towards the first end 102 or second end 104 the heated air may be confined between adjacent fins 140 over the unvented portion of base 130 until the heated air travels upward beyond an upper surface of fins 140, wherein the axial moving air may allow the fins 140 to be more uniformly heated along the longitudinal axis of heat sink 100. In further embodiments, the cross flow of air between subsequent vents 132 may impact the flow of air between each of the pair of fins 140.

Rails 150 may be removably coupled to base 130 via coupling mechanisms, such as screws 154, fasteners, etc. Rails 120 may extend from first end 102 to second end 104 of heat sink 118. Rails 150 may be configured to add rigidity and support for fins 140. Rails 150 may include a plurality of tabs 152 that extend towards a central axis of heat sink 100, and may be configured to be positioned directly over light sources 110 between the circuitry of the light source 110. When fasteners 154 are through tabs 152 and include corresponding threads on light sources 110, rails 150 may apply sufficient force against light source to allow sufficient heat transfer between the heat created by light sources and fins 140. Tabs 152 may be spaced along the longitudinal axis of heat sink 100 to more distribute the forces created by rails 150 against light sources 110. In embodiments, responsive to fasteners 154 being decoupled from light sources 110, light sources 110 may be replaced.

Figure 2:
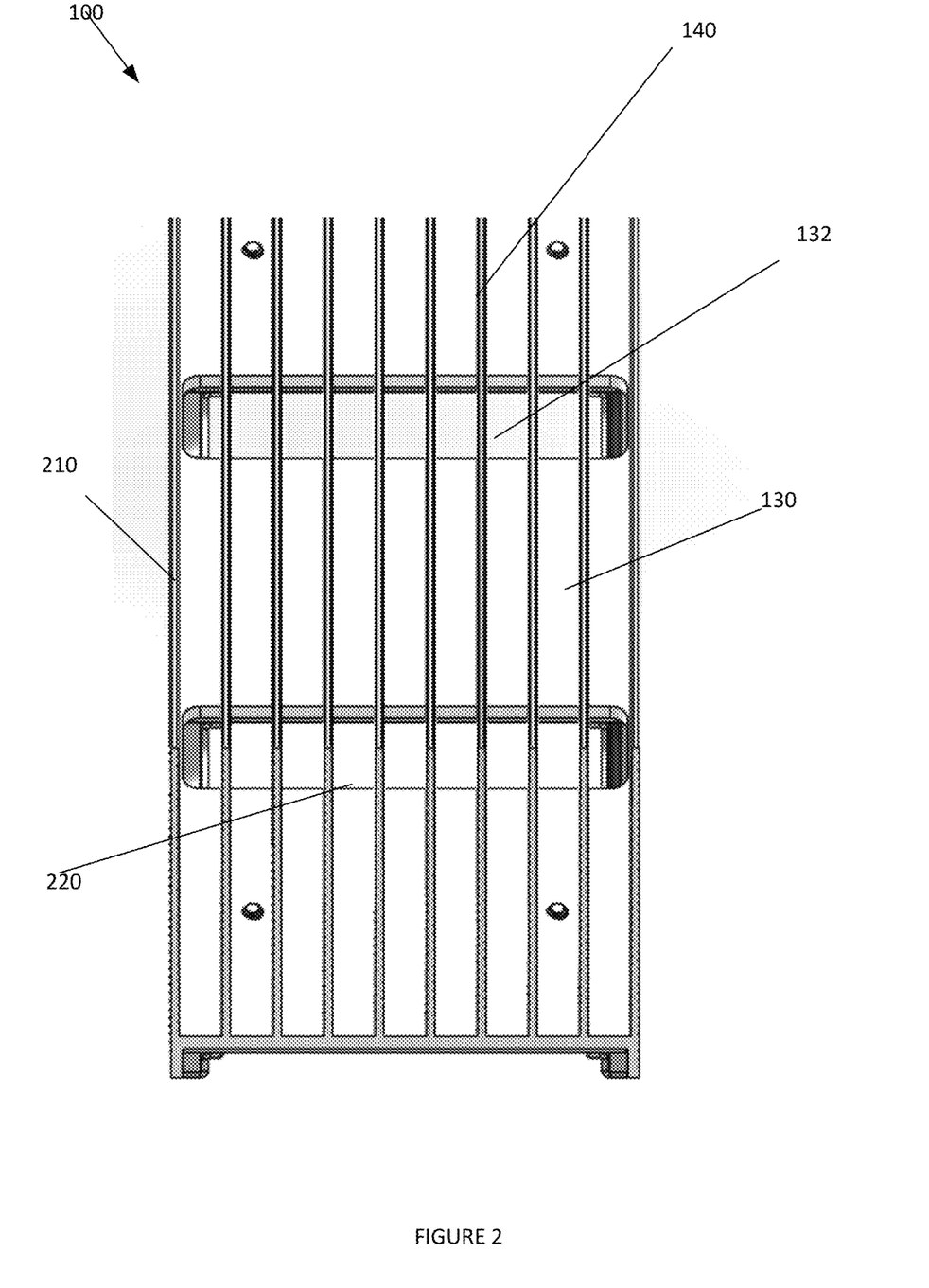
FIG. 2 depicts a top view of a heat sink, according to an embodiment.

FIG. 2 depicts a top view of heat sink 100, according to an embodiment. Elements depicted in FIG. 2 may be described above, and for the sake of brevity a further description of these elements may be omitted.

As depicted in FIG. 2, vents 132 may be openings within base 130 that extend across the lateral axis of heat sink 100. In operation, as air is being heated by the light sources, the heated air may move over edges 210 of the fins 140.

Additionally, as the air is being heated, the heated air may directly pass upward through a lower surface of the fins 140 through the vents 132. Accordingly, by positioning the vents 132 across the width of the heat sink, a portion of the heated air is only required to move vertically through the fins 140. Additionally, the heated air may pass around the edges 220 of vents 132 to enable cross flow over the unvented portion of heat sink 100. This may enable simultaneous cross flow over the unvented portion of the heat sink 100 and direct air flow through the vented portion of the heat sink 100, which may more uniformly disturbed the generated heat over the heat sink 100.

Figure 3:
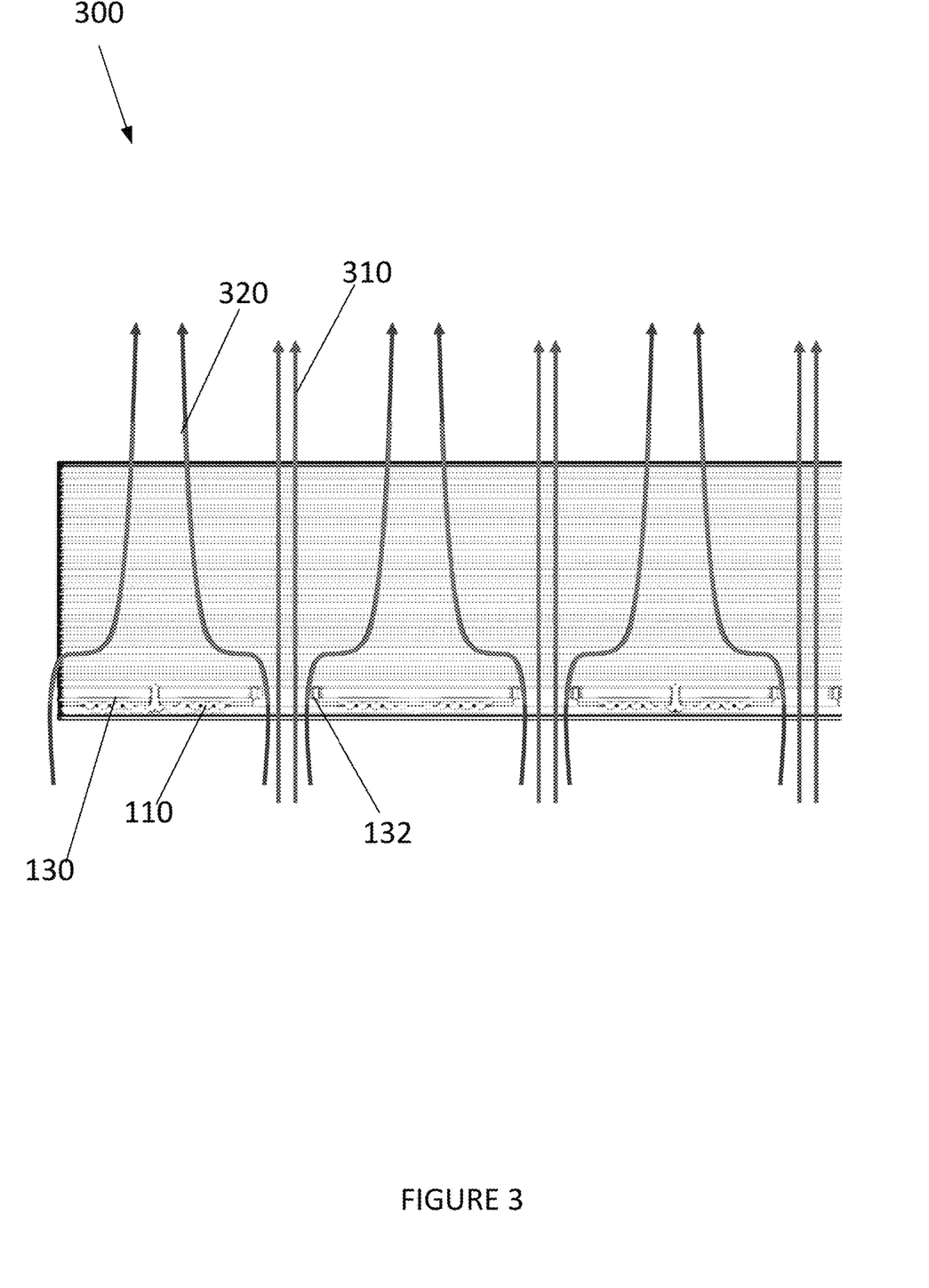
FIG. 3 depicts an air flow diagram through and around a heat sink, according to an embodiment.

FIG. 3 depicts an air flow diagram 300 through and around heat sink 100, according to an embodiment. Elements depicted in FIG. 3 may be described above, and for the sake of brevity a further description of these elements is omitted.

As depicted in FIG. 3 as cool air rises through heat sink, the air may get heated and transferred out of the system. Vents 132 may allow for cross-flow 320 through each section of heat sink 100 between vents 132, while also allowing direct flow 310 through vents 132. More so, allowing for direct flow 310 may allow for air to quickly and efficiently leave the system.

Figure 4:
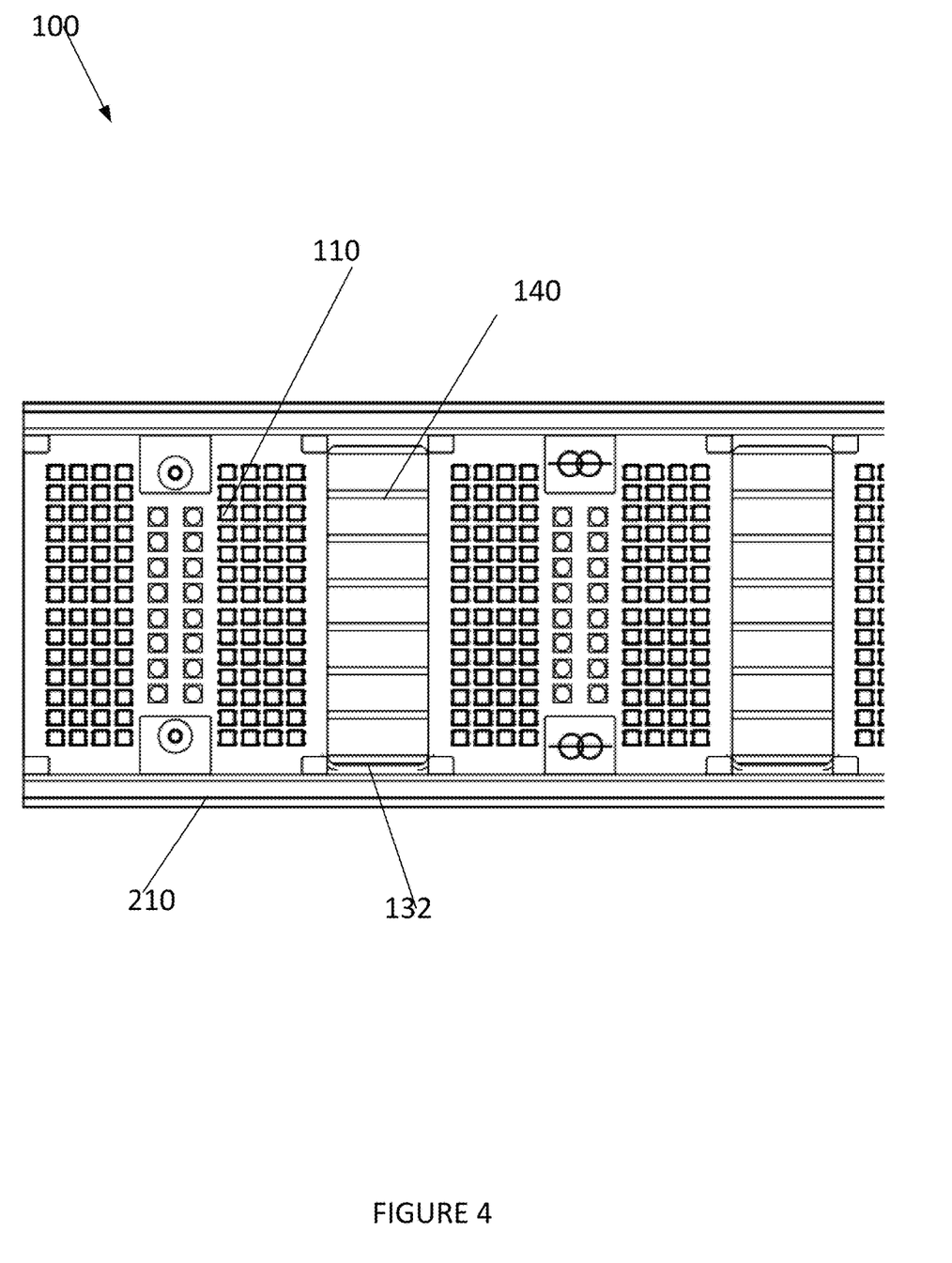
FIG. 4 depicts a bottom view of a heat sink, according to an embodiment.

FIG. 4 depicts a bottom view of heat sink 100, according to an embodiment. Elements depicted in FIG. 4 may be described above, and for the sake of brevity a further description of these elements may be omitted.

As depicted in FIG. 4, light sources 110 may be positioned between adjacent vents 132. This should allow the heat generated by light sources 110 to flow directly between fins 140 from a location below fins 140, allowing the hot air to rise directly through fins 140. The heated air that does not directly flow into vents 132 may flow around the edges 210 of heat sink 100.

Figure 5:
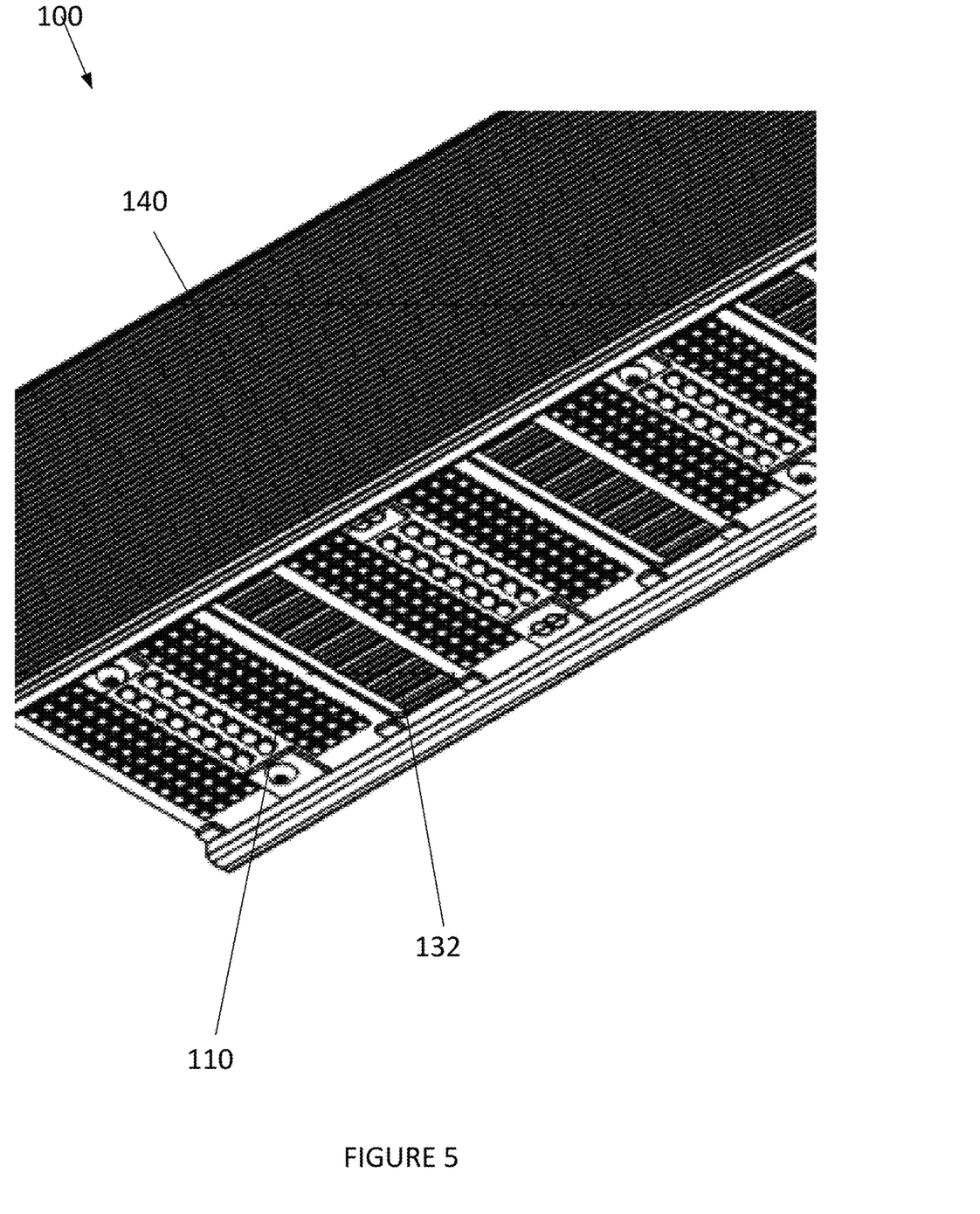
FIG. 5 depicts a bottom perspective view of a heat sink, according to an embodiment.

FIG. 5 depicts a bottom perspective view of heat sink 100, according to an embodiment. Elements depicted in FIG. 5 may be described above, and for the sake of brevity a further description of these elements may be omitted.

Figure 6:
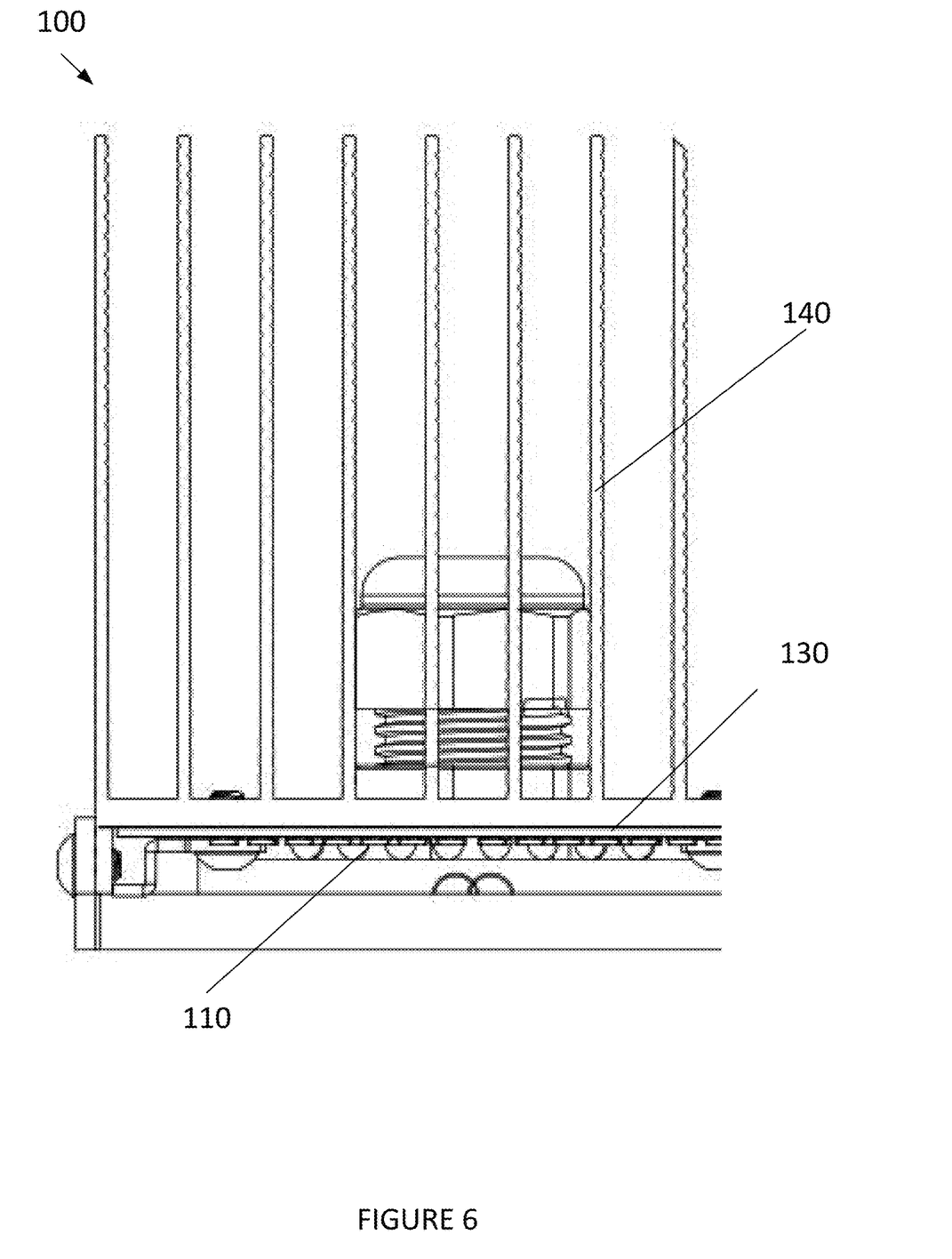
FIG. 6 depicts a front view of a heat sink, according to an embodiment.

FIG. 6 depicts a front view of heat sink 100, according to an embodiment. Elements depicted in FIG. 6 may be described above, and for the sake of brevity a further description of these elements may be omitted.

As depicted in FIG. 6, light sources 110 may be directly positioned on base 130, wherein base 130 may be formed simultaneously from a non-extruded portion of a block of metal and fins 140 may be formed by extruding the block of metal. This may allow base 130 and fins 140 to be a unitary element.

Figure 7:
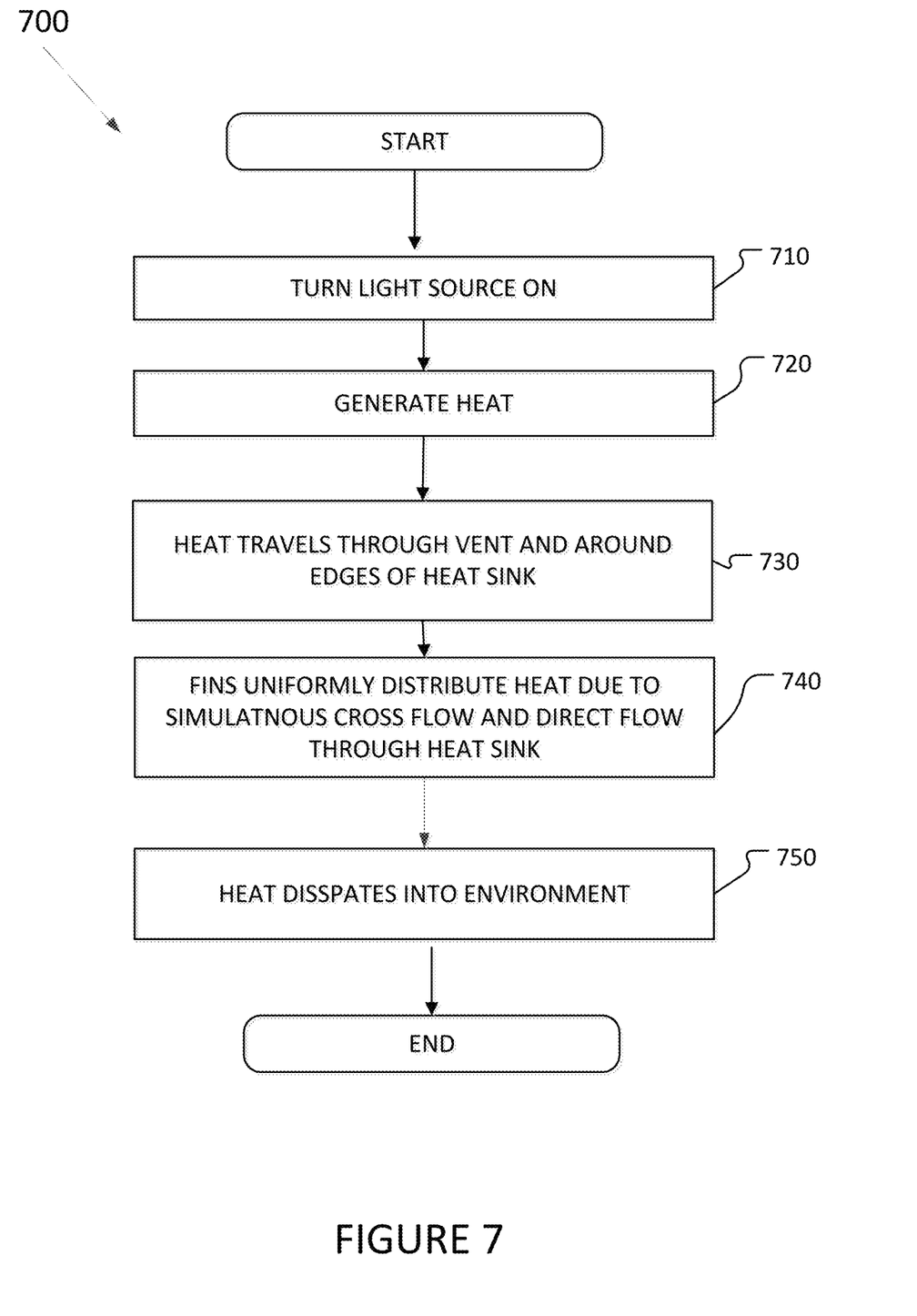
FIG. 7 illustrates a method for dissipating heat into an environment, according to an embodiment.

FIG. 7 illustrates a method 700 for dissipating heat into an environment, according to an embodiment. The operations of method 700 presented below are intended to be illustrative. In some embodiments, method 700 may be accomplished with one or more additional operations not described, and/or without one or more of the operations discussed. Additionally, the order in which the operations of method 400 are illustrated in FIG. 7 and described below is not intended to be limiting.

At operation 710, a light fixture within a greenhouse may be turned on.

At operation 720, responsive to the light fixture being turned on, the light fixture may heat the air in the environment surrounding the light fixture.

At operation 730, when the air is heated, due to convection, the heated air may move from the edges of the fins towards the central axis of the heat sink and directly through a lower surface of the fins through the vents. Accordingly, by positioning the vents across the width of the heat sink, a portion of the heated air is only required to move vertically through the fins.

At operation 740, the fins may more uniformly distributed the generated heat over the heat sink due to simultaneous cross flow over the unvented portion of the heat sink and direct air flow through the vented portion of the heat sink.

At operation 750, the heated air may move away from the light fixture and dissipate into the environment above the heat sink.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A heat sink for generating cross flow comprising:
  a base with a plurality of vents, the vents extending along a lateral axis of the heat sink;
  a plurality of fins extending along a longitudinal axis of the heat sink, wherein the plurality of fins includes a first fin and a second fin, the first and second fins being adjacent fins, wherein a length of the plurality of vents equals a distance between the first fin and the second fin, the width of the plurality of vents being longer than the length of the plurality of vents, the plurality of fins extending along in a uniform interval across the longitudinal axis of the heat sink, each of the plurality of fins includes an inner surface and an outer surface, wherein the inner surface and the outer surface extend in parallel to each other, wherein heat generated from a light source heats air that directly flows through the plurality of vents and into the plurality of fins, wherein the vents extend along the lateral axis of the heat sink such that an entirety of every inner surface of the plurality of fins is exposed via the vents.

2. The heat sink of claim 1, wherein the vents are formed by machining the base orthogonal to an extruded axis of the plurality of fins.

3. The heat sink of claim 1, wherein the plurality of vents includes a first vent and a second vent, the base includes an unvented portion positioned between the first vent and the second vent, wherein a distance from the first vent to the second vent is equal to a width of the heat sink.

4. The heat sink of claim 3, wherein the distance between the first vent and the second vent is configured to enable cross flow, wherein the heated air from the light source cross flows over the unvented portion from the first vent towards the second vent.

5. The heat sink of claim 1, wherein the cross flowing air flowing between the first fin and the second fin through the first vent travels towards a second end of the heat sink, and the cross flowing air between the first fin and the second fin through the first vent travels towards a first end of the heat sink.

6. The heat sink of claim 1, wherein faces of the plurality of the fins are etched to increase a surface area of the plurality of fins.

7. The heat sink of claim 1, further comprising:
  a first rail extending along the longitudinal axis of the heat sink,
  a second rail extending along the longitudinal axis of the heat sink, wherein the first rail includes a first plurality of tabs that are configured to extend towards a central axis of the heat sink, and the second rail includes a second plurality of tabs that are configured to extend towards the central axis of the heat sink, the first rail and the second rail being configured to apply forces against a plurality of light sources towards the plurality of fins, the plurality of light sources including the light source.

8. The heat sink of claim 7, wherein the first rail and the second rail are removably coupled to the base to allow removal and insertion of the plurality of light sources.

* * * * *